Dec. 13, 1927.
E. A. WHITE
SIZING APPARATUS
Filed Oct. 27, 1926
1,652,466
2 Sheets-Sheet 1
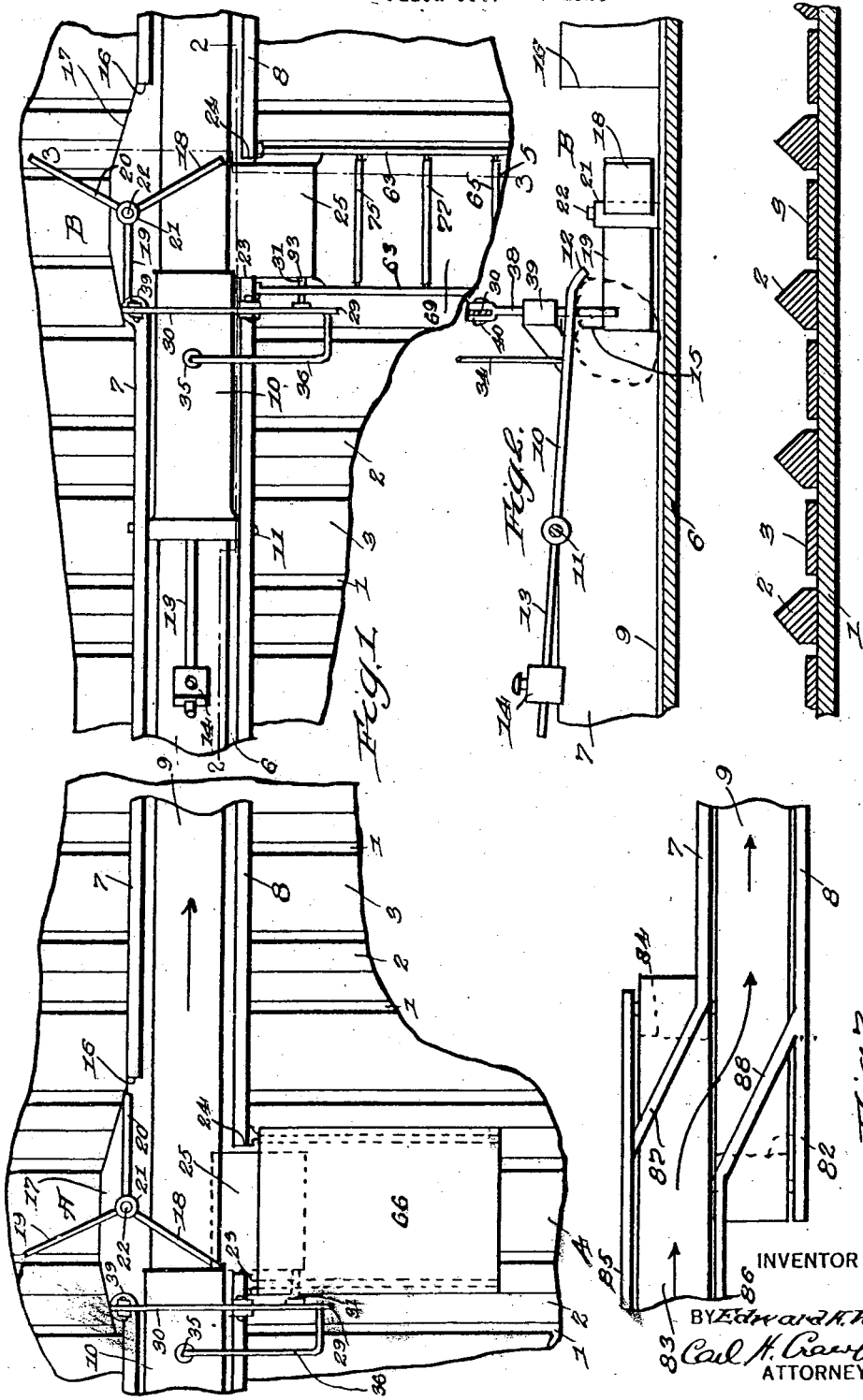
INVENTOR
BY Edward A. White
Carl N. Crawford
ATTORNEY Dec. 13, 1927.
E. A. WHITE
SIZING APPARATUS
Filed Oct. 27, 1926
1,652,466
2 Sheets-Sheet 2
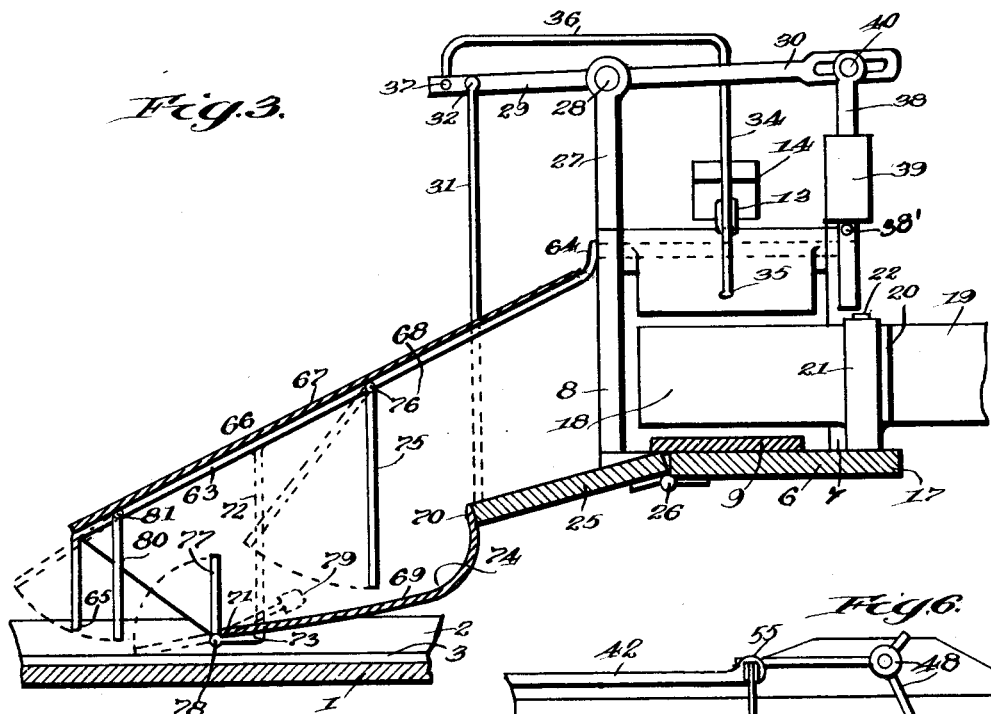
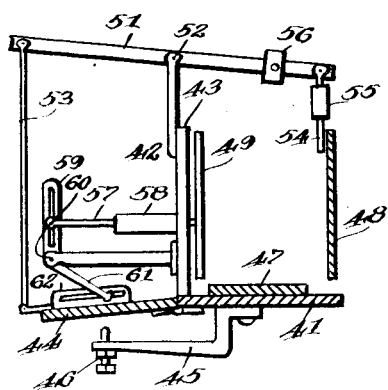
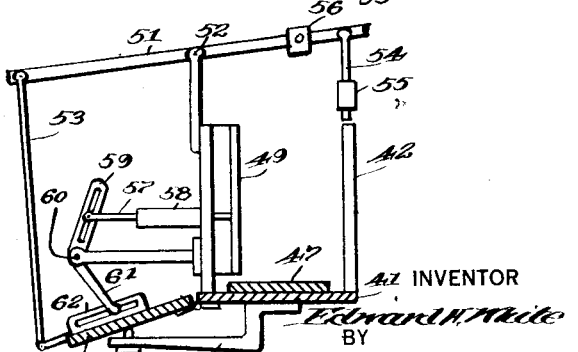

Patented Dec. 13, 1927.

1,652,466

UNITED STATES PATENT OFFICE.

EDWARD A. WHITE, OF LEWISTON, IDAHO.

SIZING APPARATUS.

Application filed October 27, 1926. Serial No. 144,567.

This invention relates to improvements in sizing apparatus for fruit and also has to do with an improved means of delivering the fruit from the sizing apparatus.

It is a feature of my invention to provide a sizing conveyor with a plurality of discharge devices in spaced relation therealong, each device discharging fruit of a given size, and in the most preferred form of my invention, the first of the several devices discharges the largest size fruit, and the next following devices discharge fruit of a decreasing size.

It is a further feature of my invention to provide discharging devices which are selectively actuated by fruit of different size to effect discharge of the same in predetermined order.

A special feature of my invention relates to a novel means of receiving the fruit discharged from said devices and causing delivery of the same onto a motion storage belt, or other point of deposition, in such a manner as to prevent injury to the fruit and also maintain the fruit in spaced relation when so delivered.

My invention has many other features and advantages which will be more fully described in connection with the accompanying drawings and which will be more particularly pointed out in and by the appended claims.

In the drawings:

Fig. 1, is a contracted plan view of one of my improved sizing conveyors superposed above a motion storage table and illustrating two of the discharge devices in different positions.

Fig. 2, is a sectional view on line 2—2 of Fig. 1.

Fig. 3, is a sectional view on line 3—3 of Fig. 1.

Fig. 4 is a sectional view of a modified form of the conveyor showing the same in a position prior to actuation by a fruit entity.

Fig. 5, is a similar view in another position.

Fig. 6, is a plan view.

Fig. 7, is a plane fragmentary view of my improved means for delivery of the fruit from the graders to the sizing conveyor.

Like characters of reference designate similar parts throughout the different figures of the drawings.

By reason of the fact that the motion storage table forms no part of the claimed subject matter of this application, I will generally refer to the same by numeral 1. The table is shown provided with dividing strips 2, and belts 3 running between said strips. I will arbitrarily designate certain belts as 4 and 5, to facilitate a later description of certain novel delivery devices, although all of said belts are identical, in actual practice.

First referring to Figs. 1 to 3, showing the preferred form, the sizing conveyor includes a substantially U-shaped trough-like conveyor structure having a bottom wall 6, a non-delivery wall 7 and a delivery wall 8. It will be seen that the sizing conveyor is slightly elevated above the motion storage table, as will be clear by reference to Figs. 2 and 3, the conveyor or conveyors run or extend longitudinally and preferably centrally of said table. I have only shown a portion of one sizing conveyor, it being understood that as many as desired, may be employed.

On the bottom wall 6, is disposed the upper lap 9, of an endless sizing belt that runs in the direction indicated by the arrow in Fig. 1, to advance the fruit lengthwise of said conveyor. As before stated, the discharge devices are actuated by the fruit discharged thereby, and I will next describe said devices in detail.

I have shown two discharge devices, the same being in different positions, and for convenience in the description thereof, I will designate the first device generally as A and the second device generally as B. The discharge device A, will discharge the largest size fruit and the device B, the next smallest, and so on as regards all sizes. While it is not usual for a packer to grade culls or other unmarketable fruit, still, sometimes by mistake, these are accidentally put in, and as they are small in size, I prefer to extend the conveyor beyond the last discharge device so that such fruit will be conveyed to a suitable point of deposition where they may be collected. Assuming that device B, was the last discharge device, such fruit would run past said device without actuating the same. As all the discharge devices are alike in structure and operation, the same will be identified by like characters of reference.

The discharge device includes what I will term an actuating gate, which is shown at 10, the same being mounted to swing about a spindle 11, and the gate having a downwardly turned or bent end 12. I provide the gate with counter-balancing means which as shown, takes the form of a stem 13, projecting from spindle 11, in a direction reverse from the direction of projection therefrom of said gate, and an adjustable weight 14, on said stem, whereby the counter-balancing function may be varied by adjustment of said weight. I have shown an apple in dotted lines, in Fig. 2, just in the act of passing under the gate and engaging the bent end 12 to elevate or rock the gate on its axis, to perform a function which will presently appear. At this point it is desired to explain that this apparatus must be very delicately attuned to eliminate friction as much as possible by reason of the fact that it is actuated by the fruit entities and dependence is placed upon the weight of such entity acquiring enough friction on the belt 9, to cause such entity to perform its operative function without slippage on the belt. Hence, the weight 14, while it acts to rock the gate 10, upwardly out of the path of the fruit, such action is counter-acted by another part of the mechanism to be presently described.

The non-delivery wall 7 is cut away, as indicated at 15 and 16, and the bottom wall 6 is extended outwardly at 17, to form a supporting platform. On this platform is a fruit ejector which is shown in the form of a winged device having wings 18, 19 and 20 extending radially in equally spaced relation from a hub 21. Said hub 21, is revolubly mounted on a spindle 22, which is secured to said platform, 17. Said wings, which in plan, are triangularly disposed, have sufficient length to reach across the belt 9 into the path of the fruit carried thereby. Wing 18, of device A, is in a position to be actuated by a fruit entity on belt 9, to turn the ejector and permit the entity to pass. In device B, the wing 19, is locked, as will be presently described, and wing 18, will be retained in an ejecting position.

I will next describe the outlets for passage of the fruit discharged from said conveyor, and will subsequently describe the mechanism coacting with the outlet, the gate and the ejector.

The delivery wall 8 has an opening therein designated at 23 and 24 for delivery of ejected fruit therethrough. A delivery board 25, is shown hinged at 26 to bottom wall 6, in retracted relation to the delivery side of the conveyor and in such a manner that the hinged edge will be slightly inside the delivery edge of belt 9, as will be clearly seen in Fig. 3. Thus, just as soon as a fruit entity leaves the belt 9, it will directly descend onto board 25. This delivery board 25, together with associated parts which will be presently described, is of sufficient weight to slightly overbalance weight 14, and when the added weight of an apple is imposed on board 25, a clear advantage is afforded with a view of insuring actuation of the mechanism to be later described. The fruit ejected onto board 25, rolls or slides downwardly thereon for delivery of such fruit to the motion storage table, as will later appear.

I will next describe the mechanism that coacts with the board 25, the ejector and the gate.

A support 27, projecting from the conveyor wall 8, has pivoted thereto at 28, a rocking lever which is shown as having a relatively short arm 29 and a relatively long arm 30. A link 31 is pivoted at 32, to arm 29, and at 33, to said board 25. An operative connection is provided between gate 10 and said lever consisting of a rod 34, swivelled at 35, to said gate, and extending laterally at 36, where it is pivoted at 37, to arm 29. A locking rod 38, is slidable vertically in a bearing 39, mounted on wall 7, and the upper end of said rod 38, is slidably connected at 40, with the longer arm 30, of said lever.

It will now be clear that when the largest size apple shown in Fig. 2, actuates the gate 10 by raising the latter, the rocking lever will be rocked in a clockwise direction viewing Fig. 3, thereby lifting board 25 and lowering the rod 38 into the path of wing 19, of discharge device A. Now as the apple advances and engages wing 18, the ejector will be revolved into the position shown in discharge device B, the wing 19 being arrested by lowered rod 38, thereby causing wing 18, to shunt the apple onto board 25, as a result of the belt 9 advancing the apple against the angularly disposed wing 18. Just as soon as the apple descends onto board 25, the weight added thereto overcomes weight 14, and the friction of the mechanism, and causes the parts to assume the delivery position shown in Fig. 3. Thus, the lever is rocked to lift rod 38, and free the ejector, and the gate 10, is lowered, and the ejector of device A, would be in the position of the ejector of device B. Thus, if the next apple were of smaller than the largest size, the gate 10 would not be actuated, and as the ejector of device A is free, the following apple would engage wing 18, the following apple would engage wing 18, and freely turn the ejector and pass on to the next, or that discharge device that was set for that particular size apple. I position the gates 10, of the various discharge devices to take care of the different size apples.

Now suppose that the said next following apple was of the largest size, then it would reactuate the mechanism of device A, as before described. It will be clear that the bent end 12, projects so far into the opening that the period of time between the actuation of the gate and locking of the ejector, and the actual ejectment of the apple onto board 25, will be so short, that the apple will be ejected before the rod 38, is raised to free the ejector. Further, and as will later appear, the fruit entities are spaced apart from each other on the belt 9, for such a distance, that an apple, or other fruit entity, will have been completely ejected from a discharge device before the next following entity reaches such device.

In the modified form shown in Figs. 4 to 6, the operation is identical with the preferred form just described but the structure is substantially different.

I employ a conveyor trough having a bottom wall 41, non-delivery and delivery side walls 42 and 43, respectively, with openings therein in the same location and for the same purpose as in the preferred form. The delivery board is indicated at 44, and I have shown a stop arm 45, having an adjustable stop 46, for limiting descending movement of said board. The conveyor belt is indicated at 47, and I have shown the same form of winged ejector which I will designate as a whole at 48, which operates in a manner identical with the ejector of the main form. The substantial difference between the main form and this modification, is the location of the fruit actuated gate which is designated at 49, and which is hinged to swing about a vertical axis on the wall 43, the hinge being indicated at 50. A rocking lever 51, is pivoted at 52 and a link 53 connects said lever with board 44, as shown. The locking rod 54, is vertically slidable in a bearing 55, and in this form, I employ an adjustable weight 56, on lever 51, to counterbalance board 44.

In Fig. 5, the gate 49 is in the normal position which is such that it projects into the path of the fruit advanced by belt 47. If an apple is of a size that it cannot pass between the gate and wall 42, the gate 49 is forced by such apple into the Fig. 4, position. In this movement, the gate 49, actuates rod 57, slidable in bearing 58, thereby rocking a bell crank lever 59, with which rod 57 is slidably connected. This lever 59, is pivoted at 60, and has an arm 61 which is slidably connected at 62, with board 44. Thus, it will be clear that gate 49, when actuated, lifts board 44, thereby rocking lever 51, to lock the ejector. When the fruit entity is delivered to board 44, the latter, because of its release from stress from the gate, and by reason of the weight of the fruit, lowers, as shown in Fig. 5, thereby releasing the ejector. As the gate 49, is then free, it will not obstruct the following fruit entities unless one of a size approaches that is large enough to again actuate the gate.

It is a great desideratum of this invention to maintain the fruit entities in separated relation, and also to prevent injury such as might result from delivery from the boards 25 or 44, down onto the motion storage table or like point of deposition. Therefore, I will next describe a novel form of cushioning delivery device which is shown applied only to the preferred form of the invention but which is equally adapted to the modified construction.

In the present construction, I employ a skeleton frame consisting of lateral top members 63, the upper ends 64, being suitably secured to wall 8, and the lower ends 65, being bent downwardly and mounted, as shown, on the dividing strips, 2. A suitable canvas or like material indicated at 66 may if desired form top and side walls 67 and 68, respectively. A cushioning bottom canvas or like wall 69, may have its upper end 70, secured to the outer edge of board 25, from whence this lower wall descends toward the outer end 71, in close proximity to the point of deposition, or table belt 4, so that the final descent of the apple onto said belt will be only a fraction of an inch. The outer end of wall 69, may be supported on an extension 72, of the frame, the extension being bent at 73, to extend under said wall.

It will now be clear that I have provided a descending runway which not only cushions the fruit in its descent but also reduces the ultimate fall onto the table to a minimum. I consider the device practical and advantageous, as thus far described, however, I claim it a feature to provide means which will act to keep the apples separated from each other, and provide for final delivery to the table 1, in the same or sufficiently separated relation to always prevent contact between the apples.

It will be noted that I have provided the greatest extent of drop at 74, so that the remainder of the decline will be extremely gentle. Just after the apple has reached the portion 74, I provide a swinging retarder 75, suitably hinged at 76, to frame members 63. This initial retarder 75 slows up descent of the apple and causes it to advance very slowly until after the apple passes beyond the retarder 75 which will have been swung into the dotted line position. At the terminal end 71, of the bottom wall 69, I provide another retarder 77, which is hinged to swing about a pivot 78, into the dotted line position, a weight 79, or like means insuring return of said retarder to its initial full line position. I also provide a terminal retarder 80, pivoted at 81, which offers a retarding resistance to the apple just as it reaches the belt 4.

Now it will be clear that even if the stock should run predominately to a given size, and in the event that the apples were delivered unusually rapidly to the device, still the successive action of the plurality of retarding devices will not only slow up the speed of said apples but will also keep them separated.

I will next refer to the improved means for automatically spacing the fruit entities when they are delivered to the sizing conveyor.

Referring to Fig. 7, it will be seen that the left hand end of the belt 9 is trained about a roller 82, suitably journalled. Extending along side of the sizer's belt 9, is a grader's belt 83, the right hand end of which is trained about a roller 84. It will be noted that the parallel belts 9 and 83, overlap sufficiently so that a considerable space exists between the rollers 82 and 84. Further, the grader's conveyor has side walls 85 and 86. Now it is a feature of this device to not only transfer the fruit entities from belt 83 to belt 9, but to do so in a manner that there will be no interruption at the point of transfer, and so that fruit entities which may be placed in close relation on belt 83, by the graders, will be in substantially equidistant spaced relation when delivered onto belt 9.

In order to accomplish these various functions, I dispose the belts in such close lateral relation that the adjacent edges are only slightly out of contact, and I run the belt 9 practically three times as fast as belt 83, in order to get the spacing referred to. In order to make the transfer, I provide deflecting means which, as shown, takes the form of a deflecting wall 87, extending at an angle from wall 85 to wall 7, and a like wall 88, which extends angularly from wall 86 to wall 8. Now it will be seen that these deflecting walls 87 and 88 are so far between the bights of the two belts that no pocket could be formed which would slow up the transfer. It will be seen that this construction does not reverse the direction of the fruit but very gently changes or alters its course of movement in such a manner as most effectively to avoid rubbing and injurious contacts.

It is believed that the device of my invention will be fully understood from the foregoing description, and while I have herein shown and described one specific form of my invention, I do not wish to be limited thereto except for such limitations as the claims may import.

I claim;

1. In a fruit sizer apparatus, a sizing delivery conveyor of substantially U-shaped cross section having delivery and non-delivery side walls and a bottom wall, a sizing belt travelling along said bottom wall, a plurality of discharging devices for said conveyor each comprising a sizing gate pivotally disposed in said conveyor and adapted to be actuated by the fruit of a given size passing therethrough, said delivery wall having a fruit discharge opening in following relation to said gate, a pivoted delivery board subjacent said opening and adapted to be actuated by fruit passing over the same, a plural winged fruit ejector rotatable about a substantially vertical axis in said conveyor in following relation to said gate and abreast of said opening, and mechanism actuated by said gate for raising said board and holding said ejector in a fruit discharging position to discharge a fruit entity over said board, said mechanism being actuated by said board under the action and weight of the entity to release said ejector and restore said gate to a fruit actuating position.

2. In a fruit sizing apparatus, a sizing delivery conveyor of substantially U-shaped cross section and a belt, a plurality of discharging devices for said conveyor each comprising a sizing gate adapted to be actuated by fruit of a given size, a delivery board, an ejector, and mechanism actuated by said gate for holding said ejector in a fruit discharging position and operated by said board to release said ejector and restore said gate to a fruit actuating position.

3. In a fruit sizing apparatus, a sizing conveyor means having a fruit discharging device, said device including an idly movable fruit ejector actuated by the fruit from fruit discharging to fruit passage positions, means releasably holding said ejector in fruit passage or discharge positions, means actuated by the fruit for positively holding said ejector in a fruit discharging position, and means actuated by the fruit for releasing said ejector from a fruit discharging position.

4. In a fruit sizing apparatus, a sizing conveyor means having a fruit discharging device, said device including a fruit actuable ejector movable to fruit ejecting and passage positions, fruit actuated sizing means for holding said ejector in a fruit discharging position, and means actuated by the discharging fruit for releasing said ejector.

5. In a fruit sizing apparatus, a sizing conveyor means having a fruit actuated ejecting member, a fruit actuated gate member and a fruit actuated delivery board member, and mechanism coactively connected with said members to cause the fruit entities to hold said ejector in a fruit ejecting or fruit passage position.

6. In a fruit sizing apparatus, a sizing conveyor means having a flexible declining fruit delivery member, and means coacting with said member for maintaining the fruit entities in separated relation.

7. In a fruit sizing apparatus, a sizing conveyor means having a declining fruit delivery device, and a series of fruit separating and retarding gates coacting with the fruit entities descending said device.

8. In a fruit sizing apparatus, a sizing conveyor means having a declining fruit delivery device, and a series of pivoted fruit separating and retarding gates coacting with the fruit entities descending said device, and said gates being pivoted above and below the path of movement of said entities.

9. In a fruit sizing apparatus, a conveyor trough having a delivery wall and a belt, a fruit ejector on said trough having a wing extending across said belt, and fruit actuated mechanism for holding said ejector in a fruit ejecting position or releasing said ejector for passage of the fruit thereby.

10. In a fruit sizing apparatus, a conveyor trough having a delivery wall and a belt, a rotatable fruit ejector on said trough having a plurality of wings adapted to successively extend across said belt, and fruit actuated means for holding said ejector with one wing in a fruit ejecting position or releasing said ejector for passage of the fruit thereby.

11. In a fruit sizing apparatus, a substantially U-shaped conveyor having a delivery wall provided with a fruit discharge opening, a belt for advancing the fruit in said trough, a plural winged fruit ejector rotatable about a substantially vertical axis in said conveyor abreast of said opening, and mechanism actuated by the fruit for holding said ejector in a fruit ejecting or fruit releasing position.

12. In a fruit sizing apparatus, a sizing conveyor means having a fruit discharging device, said device including a fruit actuable ejector movable to fruit ejecting and passage positions, and fruit actuated sizing means for releasably holding said ejector in a fruit ejecting position.

13. In a fruit sizing apparatus, a sizing conveyor means having a fruit discharging device, said device including a fruit actuable ejector movable to fruit ejecting and passage positions, and fruit actuated means for releasing said ejector from a fruit ejecting position.

14. In a fruit sizing apparatus, a conveyor trough, a belt therein, a sizing gate in said trough adapted to be actuated by fruit of a given size, a fruit ejector in said trough, and means actuated by said gate for controlling said ejector.

In testimony that I claim the foregoing as my own, I hereby affix my signature.

EDWARD A. WHITE.